(12) United States Patent  
Ito

(10) Patent No.: US 10,509,609 B2  
(45) Date of Patent: Dec. 17, 2019

(54) IMAGE FORMING APPARATUS

(71) Applicant: KONICA MINOLTA, INC., Chiyoda-ku, Tokyo (JP)

(72) Inventor: Shuichi Ito, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/161,443

(22) Filed: Oct. 16, 2018

(65) Prior Publication Data

US 2019/0155555 A1 May 23, 2019

(30) Foreign Application Priority Data

Nov. 22, 2017 (JP) ................................. 2017-224357

(51) Int. Cl.
G06F 3/12 (2006.01)
H04N 1/00 (2006.01)
G06K 15/02 (2006.01)

(52) U.S. Cl.
CPC .......... G06F 3/1234 (2013.01); G06F 3/1208 (2013.01); H04N 1/00029 (2013.01); H04N 1/00037 (2013.01)

(58) Field of Classification Search
None
See application file for complete search history.

(56) References Cited

U.S. PATENT DOCUMENTS

| 2009/0245589 A1* | 10/2009 | Komoto | B41J 13/10 382/112 |
| 2011/0103809 A1* | 5/2011 | Kuwata | G03G 15/234 399/16 |
| 2011/0135321 A1* | 6/2011 | Ito | G03G 15/5016 399/15 |
| 2013/0215448 A1* | 8/2013 | Gentile | B41J 11/008 358/1.13 |
| 2014/0083915 A1* | 3/2014 | Nakada | B41F 33/0036 209/552 |
| 2015/0063654 A1* | 3/2015 | Kitai | G06T 7/001 382/112 |

(Continued)

FOREIGN PATENT DOCUMENTS

| JP | 10-086455 | * | 4/1998 | ................ B41J 3/54 |
| JP | 2015117957 A | | 6/2015 | |
| JP | 2015-120264 | * | 7/2015 | ............. B41J 29/38 |

Primary Examiner — Beniyam Menberu  
(74) Attorney, Agent, or Firm — Holtz, Holtz & Volek PC

(57) ABSTRACT

An image forming apparatus includes: an image forming part that forms an image on printing paper; an image reader that reads a printed material including the image formed on printing paper by the image forming part; and a hardware processor that determines whether the printed material including the image formed on printing paper by the image forming part is non-defective in accordance with a threshold for determination and read data, the threshold for determination specifying an error margin in a printed state of the printed material including the image formed on printing paper by the image forming part, the read data corresponding to the printed material read by the image reader, wherein the hardware processor performs control to reprint a page on which the printed material including the image formed on printing paper by the image forming part is determined to be defective, and replace the page.

9 Claims, 3 Drawing Sheets

(56) References Cited

U.S. PATENT DOCUMENTS

| | | | |
|---|---|---|---|
| 2015/0078627 A1* | 3/2015 | Fukase | G06T 7/001 382/112 |
| 2015/0269719 A1* | 9/2015 | Kitai | G06T 7/0002 358/474 |
| 2016/0142560 A1* | 5/2016 | Shijoh | G06K 15/025 358/1.14 |

* cited by examiner ered and replace the page.

IMAGE FORMING APPARATUS

The entire disclosure of Japanese patent Application No. 2017-224357, filed on Nov. 22, 2017, is incorporated herein by reference in its entirety.

BACKGROUND

Technological Field

The present disclosure relates to an image forming apparatus.

Description of the Related Art

There is an inspection technique for determining the quality of an image by reading the image formed on a recording material such as paper by an image forming apparatus. For example, there is a suggested method by which the quality of an image is determined in accordance with a threshold for determination, the threshold for determination is then changed, the quality of the image is redetermined, a defective region is identified, and an image indicating the identified defective region is displayed (see JP 2015-117957 A, for example).

By the conventional technique disclosed in JP 2015-117957 A, a check is made to determine whether a printed material having an image formed on a paper sheet is non-defective, and the number of detected defects or the like can be displayed for each page. However, removing and replacing waste paper sheets determined to be defective with non-defective materials is troublesome, and therefore, productivity might drop considerably.

SUMMARY

The present disclosure has been made in view of such circumstances, and an object of the present disclosure is to increase productivity in a case where waste paper determination is performed, and defective materials are removed and replaced with non-defective materials.

To achieve the abovementioned object, according to an aspect of the present invention, an image forming apparatus reflecting one aspect of the present invention comprises: an image forming part that forms an image on printing paper; an image reader that reads a printed material including the image formed on printing paper by the image forming part; and a hardware processor that determines whether the printed material including the image formed on printing paper by the image forming part is non-defective in accordance with a threshold for determination and read data, the threshold for determination specifying an error margin in a printed state of the printed material including the image formed on printing paper by the image forming part, the read data corresponding to the printed material read by the image reader, wherein the hardware processor performs control to reprint a page on which the printed material including the image formed on printing paper by the image forming part is determined to be defective, and replace the page.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
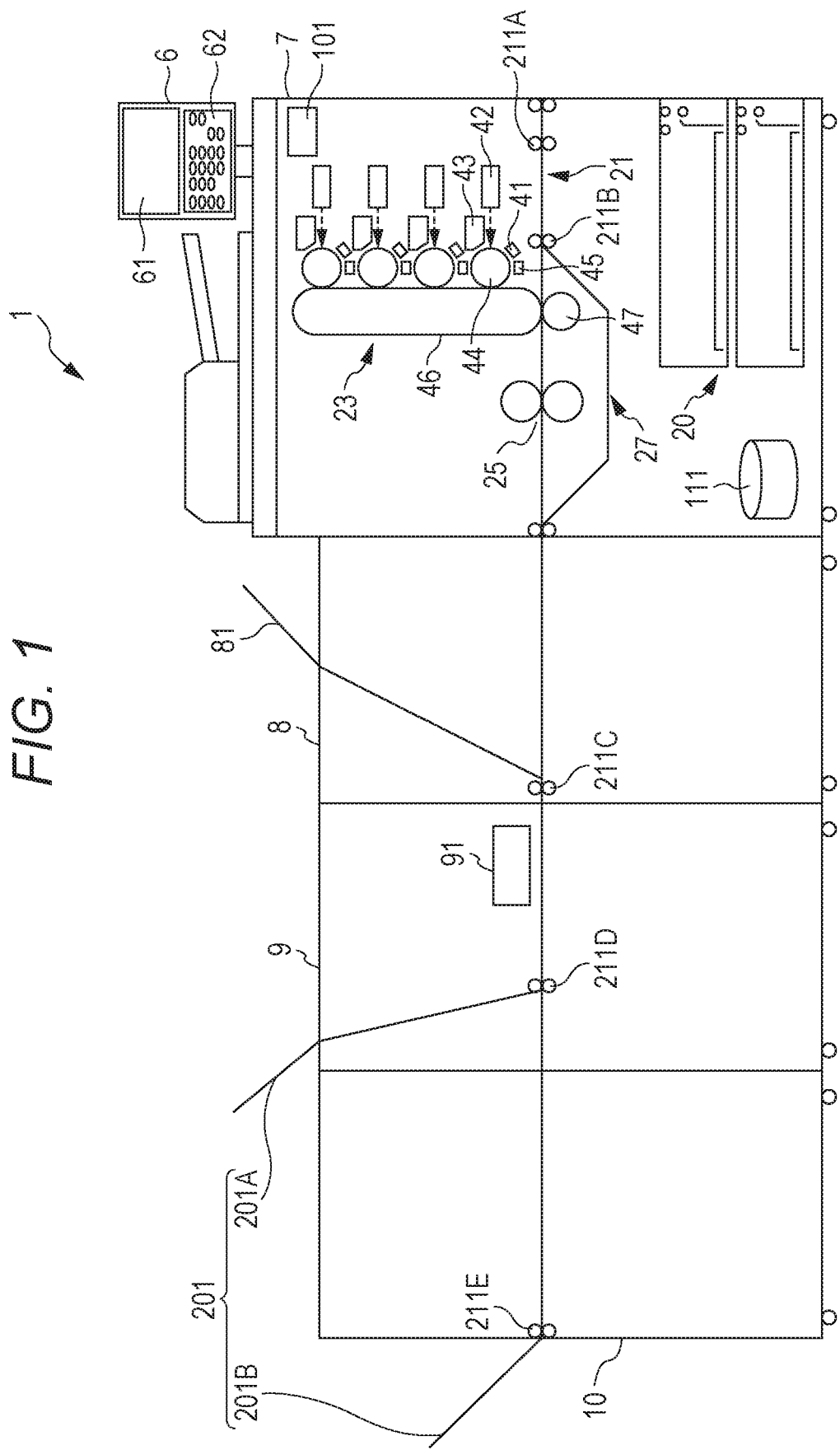
FIG. 1 is a diagram showing an example structure of an entire image forming apparatus 1 according to a first embodiment of the present disclosure.

FIG. 1 is a diagram showing an example structure of an entire image forming apparatus 1 according to a first embodiment of the present disclosure. As shown in FIG. 1, the image forming apparatus 1 includes an image forming apparatus main body 7, a post-processing device 8 is connected to the sheet ejection side of the image forming apparatus main body 7, a post-processing device 9 is connected to the sheet ejection side of the post-processing device 8, and a post-processing device 10 is connected to the sheet ejection side of the post-processing device 9. A page inserter 81 is provided on an upper portion of the post-processing device 8. The page inserter 81 conveys the printed material to be subjected to redetermination page by page to the post-processing device 9, which is at the latter stage side of the image forming apparatus 1. The printed material includes an image formed on printing paper by an image forming part 23. The conveyance to the post-processing device 9 by the page inserter 81 is controlled by third conveyance rollers 211C. The third conveyance rollers 211C are provided in the printed material conveyance path 21 in the post-processing device 8 and on the printed material ejection side of the post-processing device 8. In the post-processing device 9, an image reader 91 is provided on a printed material conveyance path 21. The image reader 91 is formed with an in-line sensor, for example, and generates read data corresponding to the printed material by reading the printed material in the main scanning direction depending on the conveyance of the printed material. In the post-processing device 9, fourth conveyance rollers 211D are provided in the printed material conveyance path 21 and on the downstream side of the image reader 91 in the moving direction of the printed material. A first tray 201A is provided to extend from the fourth conveyance rollers 211D toward the outside of the housing of the post-processing device 9. Accordingly, the printed material is ejected onto the first tray 201A by the fourth conveyance rollers 211D. In the post-processing device 10, fifth conveyance rollers 211E are provided in the printed material conveyance path 21, and on the downstream side in the moving direction of the printed material and the printed material ejection side in the post-processing device 10. A second tray 201B is provided to extend from the fifth conveyance rollers 211E toward the outside of the housing of the post-processing device 10. Accordingly; the printed material is ejected onto the second tray 201B by the fifth conveyance rollers 211E. Note that, when collectedly called, the first tray 201A and the second tray 201B are referred to as the ejector 201. Further, the second tray 201B is provided at a different position from the first tray 201A.

In the image forming apparatus 1, the image forming part 23 that forms an image on printing paper stored in a sheet feeder unit 20 is provided in the image forming apparatus main body 7, and a setting unit 6 is provided on an upper portion of the image forming apparatus main body 7. The setting unit 6 includes a display unit 61 and an operation unit 62. The setting unit 6 accepts an operation of an operator via the operation unit 62, and displays information on the display unit 61. For example, the setting unit 6 changes the threshold for determination, selects a redetermination mode, and selects the read data to be used for redetermination. The threshold for determination specifies error margins in the printed state of the printed material including the image formed on printing paper by the image forming part 23. For example, the threshold for determination specifies a margin of error in smudge size, density, or inclination of the image formed on the printed material. The redetermination mode is a mode in which waste paper determination is made again after waste paper determination is made. The read data to be used in redetermination is stored in a storage unit 111 provided in the image forming apparatus main body 7. The read data to be used in redetermination is read by the image reader 91. The storage unit 111 is formed with a nonvolatile semiconductor memory such as a flash memory, or a hard disk drive, for example, and stores various kinds of data. In addition to the read data, the storage unit 111 stores image data for forming an image on a printed material, for example. The image data is obtained by performing screen processing on a print job received by the image forming apparatus 1.

An automatic sheet feeding device and an original image scanning device that automatically read a document are provided on the image forming apparatus main body 7 The original image scanning device is capable of reading an image via a platen glass. The original image scanning device reads an image of a document, for example. The read image is stored into the storage unit 111, and is used for forming an image by the image forming part 23. The image forming part 23 is provided in the conveyance path 21 and on the downstream side in the direction of conveyance of the printing paper by first conveyance rollers 211A. The first conveyance rollers 211A feed the printing paper stored in the sheet feeder unit 20, and convey the printing paper toward the image forming part 23. The image forming part 23 includes photosensitive members 44 prepared for the respective colors such as cyan, magenta, yellow, and black. A charging device 41, an exposure device 42, and a developing device 43 are provided around each of the photosensitive members 44.

The surfaces of the photosensitive members 44 charged by the charging devices 41 are subjected to image exposure by the exposure devices 42 in accordance with image information about the document stored in the storage unit 111, and thus, electrostatic latent images are formed. The electrostatic latent images are developed into toner images by the developing devices 43. The toner images are transferred onto an intermediate transfer belt 46. The toner images transferred onto the intermediate transfer belt 46 are transferred onto the printing paper being conveyed along the conveyance path 21 by second conveyance rollers 211B while being pressed by a secondary transfer roller 47. The second conveyance rollers 211B not only convey the printing paper along the conveyance path 21 but also convey a printed material along a detour path 27. That is, the second conveyance rollers 211B convey printing paper or a printed material along the conveyance path 21 or the detour path 27. The detour path 27 causes a printed material to make a detour to avoid the image forming part 23. The toner image that has been pressed and transferred by the secondary transfer roller 47 is heated and pressed by a fixing unit 25 and is fixed onto the printing paper. As a result, a printed material is produced by the image forming apparatus main body 7. That is, the image forming part 23 performs image formation by an electrophotographic process, to transfer an image onto printing paper. A drum cleaning device 45 is provided around each photosensitive member 44. The drum cleaning devices 45 remove residual toner remaining on the intermediate transfer belt 46. The conveyance path 21 is a path for feeding and conveying printing paper from the sheet feeder unit 20. Note that the first conveyance rollers 211A, the second conveyance rollers 211B, the third conveyance rollers 211C, the fourth conveyance rollers 211D, and the fifth conveyance rollers 211E are collectively referred to as a conveyance unit 211.

A controller 101 includes a CPU, a ROM, a RAM, an I/O interface, and the like that are not shown in the drawing. The CPU reads a program in accordance with the purpose of processing from the ROM, and loads the program into the RAM. In conjunction with the loaded program, the CPU controls operation of the image forming apparatus 1. The various kinds of data stored in the storage unit 111 are referred to when the CPU controls operation of the image forming apparatus 1. Specifically, in accordance with the threshold for determination and the read data corresponding to the printed material read by the image reader 91, the controller 101 determines whether the printed material including the image formed on printing paper by the image forming part 23 is non-defective. More specifically, the controller 101 performs control so that the page on which the printed material including the image formed on printing paper by the image forming part 23 is determined to be defective is reprinted, and the page is replaced.

In a case where there is the read data corresponding to a printed material when the threshold for determination is updated, the controller 101 determines whether the printed material is non-defective, using the read data corresponding to the printed material. In a case where there is no read data corresponding to the printed material when the threshold for determination is updated, the controller 101 causes the image forming part 23 to form an image on printing paper, and causes the image reader 91 to read the image formed on the printing paper and generate read data. The controller 101 ejects each printed material determined to be non-defective onto one of the first tray 201A and the second tray 201B, and ejects each printed material determined to be defective to the other one of the first tray 201A and the second tray 201B. In a case where a printed material determined to be defective is replaced with a printed material determined to be non-defective, the controller 101 determines whether a new printed material having an image formed on printing paper by the image forming part 23 is defective while suspending the feeding of the next printed material. If the new printed material is determined to be non-defective, the new printed material is ejected onto either the first tray 201A or the second tray 201B, whichever has materials determined to be non-defective.

Figure 2:
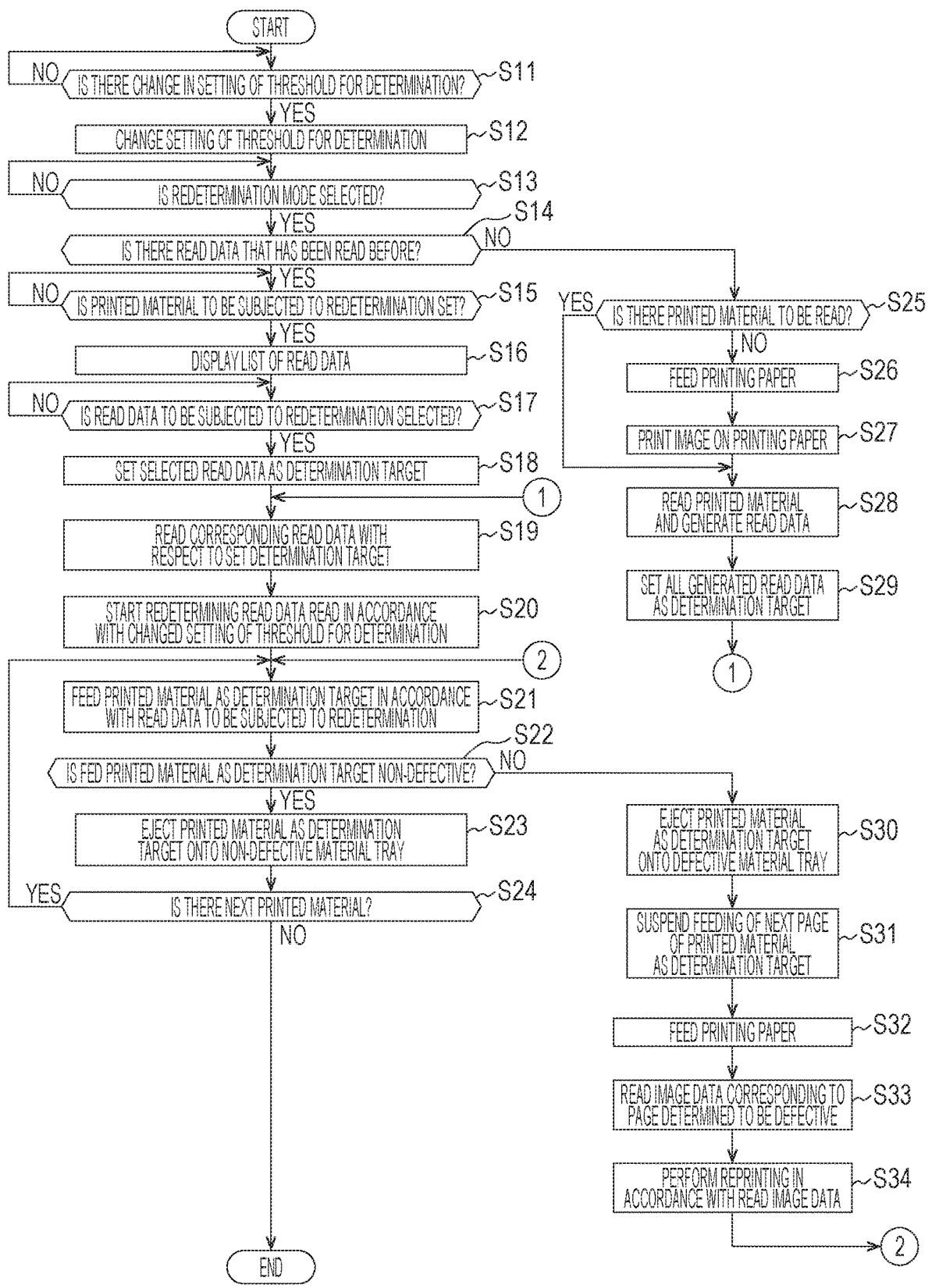
FIG. 2 is a flowchart explaining an example of control according to the first embodiment of the present disclosure.

FIG. 2 is a flowchart for explaining an example of control according to the first embodiment of the present disclosure. In step S11, the controller 101 determines whether there is a change in the setting of the threshold for determination. If determining that there is a change in the setting of the threshold for determination (step S11: Y), the controller 101 moves on to the processing in step S12. If determining that there is no change in the setting of the threshold for determination (step S11: N), the controller 101 continues the processing in step S11. In step S12, the controller 101 changes the setting of the threshold for determination. In step S13, the controller 101 determines whether the redetermination mode is selected. If determining that the redetermination mode is selected (step S13: Y), the controller 101 moves on to the processing in step S14. If determining that the redetermination mode is not selected (step S13: N), the controller 101 continues the processing in step S13. In step S14, the controller 101 determines Whether there is read data that has been read before. If determining that there is read data that has been read before (step S14: Y), the controller 101 moves on to the processing in step S15. If determining that there is no read data that has been read before (step S14: N), the controller 101 moves on to the processing in step S25. In step S15, the controller 101 determines whether the printed material to be subjected to redetermination is set. If determining that the printed material to be subjected to redetermination is set (step S15: Y), the controller 101 moves on to the processing in step S16. If determining that the printed material to be subjected to redetermination is not set (step S15: N), the controller 101 continues the processing in step S15. Note that, in the determination process in step S15, sensors (not shown) provided in the page inserter 81 and the sheet feeder unit 20, for example, may determine whether the printed material is set.

In step S16, the controller 101 performs control so that a list of read data is displayed. Specifically, the display unit 61 is made to display read data on a job-by-job basis. This enables the user to select read data via the operation unit 62 on a job-by-job basis. In step 17, the controller 101 determines whether the read data to be subjected to redetermination is selected. If determining that the read data to be subjected to redetermination is selected (step S17: Y), the controller 101 moves on to the processing in step S18. If determining that the read data to be subjected to redetermination is not selected (step S17: N), the controller 101 continues the processing in step S17. In step S18, the controller 101 sets the selected read data as the determination target. In step S19, the controller 101 reads the read data corresponding to the set determination target. In step S20, the controller 101 starts redetermining the read data that has been read, in accordance with the changed setting of the threshold for determination.

In step S21, the controller 101 performs control so that the printed material as the determination target is fed in accordance with the read data to be subjected to redetermination. In step S22, the controller 101 determines whether the fed printed material as the determination target is non-defective. If determining that the fed printed material as the determination target is non-defective (step S22: Y), the controller 101 moves on to the processing in step S23. If determining that the fed printed material as the determination target is defective (step S22: N), the controller 101 moves on to the processing in step S30. In step S23, the controller 101 performs control so that the printed material as the determination target is ejected onto the non-defective material tray. For example, if the first tray 201A is the non-defective material tray, the printed material is ejected onto the first tray 201A. In step S24, the controller 101 determines whether there is the next printed material. If determining that there is the next printed material (step S24: Y), the controller 101 returns to the processing in step S21. If determining that there is no more printed material (step S24: N), the controller 101 ends the process.

In step S25, the controller 101 determines Whether there is a printed material to be read. If determining that there is a printed material to be read (step S25: Y), the controller 101 moves on to the processing in step S28. If determining that there is no printed material to be read (step S25: N), the controller 101 moves on to the processing in step S26. In step S26, the sheet feeder unit 20 feeds printing paper. In step S27, the image forming part 23 prints an image on the printing paper. In step S28, the image reader 91 reads the printed material and generates read data. In step S29, the controller 101 sets all the generated read data as the determination target, and moves on to the processing in step S19.

In step S30, the controller 101 performs control so that the printed material as the determination target is ejected onto the defective material tray. For example, if the second tray 201E is the defective material tray, the printed material is ejected onto the second tray 201B. In step S31, the controller 101 performs control to suspend the feeding of the next page of the printed material as the determination target. In step S32, the controller 101 performs control to feed printing paper. In step S33, the controller 101 reads the image data corresponding to the page determined to be defective. The image data is stored in the storage unit 111, for example. In step S34, the controller 101 performs control so that reprinting is performed in accordance with the read image data, and returns to the processing in step S21.

As described above, in the first embodiment, a page on which a printed material including an image formed on printing paper by the image forming part 23 is determined to be defective is reprinted, and the page is replaced. Therefore, even if there are a plurality of printed materials, the pages corresponding to a defective material among the printed materials are replaced. Accordingly, it is possible to improve productivity in a case where defective materials are removed through waste paper determination and are replaced with non-defective materials.

Further, in the first embodiment, in a case where there is the read data corresponding to a printed material when the threshold for determination is updated, a check is made to determine whether the printed material is non-defective, from the read data corresponding to the printed material. As a check is made to determine whether the printed material is non-defective without re-reading, the processing time required in the determination of defectiveness can be shortened. Thus, overall productivity can be improved.

Also, in the first embodiment, in a case where there is no read data corresponding to a printed material when the threshold for determination is updated, an image is formed on printing paper by the image forming part 23. Accordingly, a printed material for reading a printed material is printed only when necessary, and there is no need to perform unnecessary image formation. Thus, the overall cost of determination of printed material defectiveness can be reduced.

Further, in the first embodiment, each printed material determined to be non-defective is ejected onto one of the first tray 201A and the second tray 201B, and each printed material determined to be defective is ejected onto the other one of the first tray 201A and the second tray 201B. In this manner, non-defective materials are ejected separately from defective materials. Accordingly, it is possible to eliminate the step of separating non-defective materials from defective materials among a plurality of printed materials. Thus, the number of steps required in determining non-defective materials can be remarkably reduced.

Also, in the first embodiment, the detour path 27 for causing a printed material to avoid the image forming part 23 is provided. Accordingly, there is a path through which a printed material passes without passing through the image forming part 23. Thus, it is possible to avoid a situation where a printed material is smudged or shrinks due to the image forming part 23.

Further, in the first embodiment, in a case where a printed material determined to be defective is replaced with a printed material determined to be non-defective, an image is formed on printing paper by the image forming part 23 while the feeding of the next printed material is suspended. Accordingly, feeding of the next printed material that is a defective material can be prevented, and a material generated by newly printing the page corresponding to the defective material can be inserted. Thus, the pages of printed materials corresponding to non-defective materials are arranged in order, and the number of process steps can be dramatically reduced.

Second Embodiment

Figure 3:
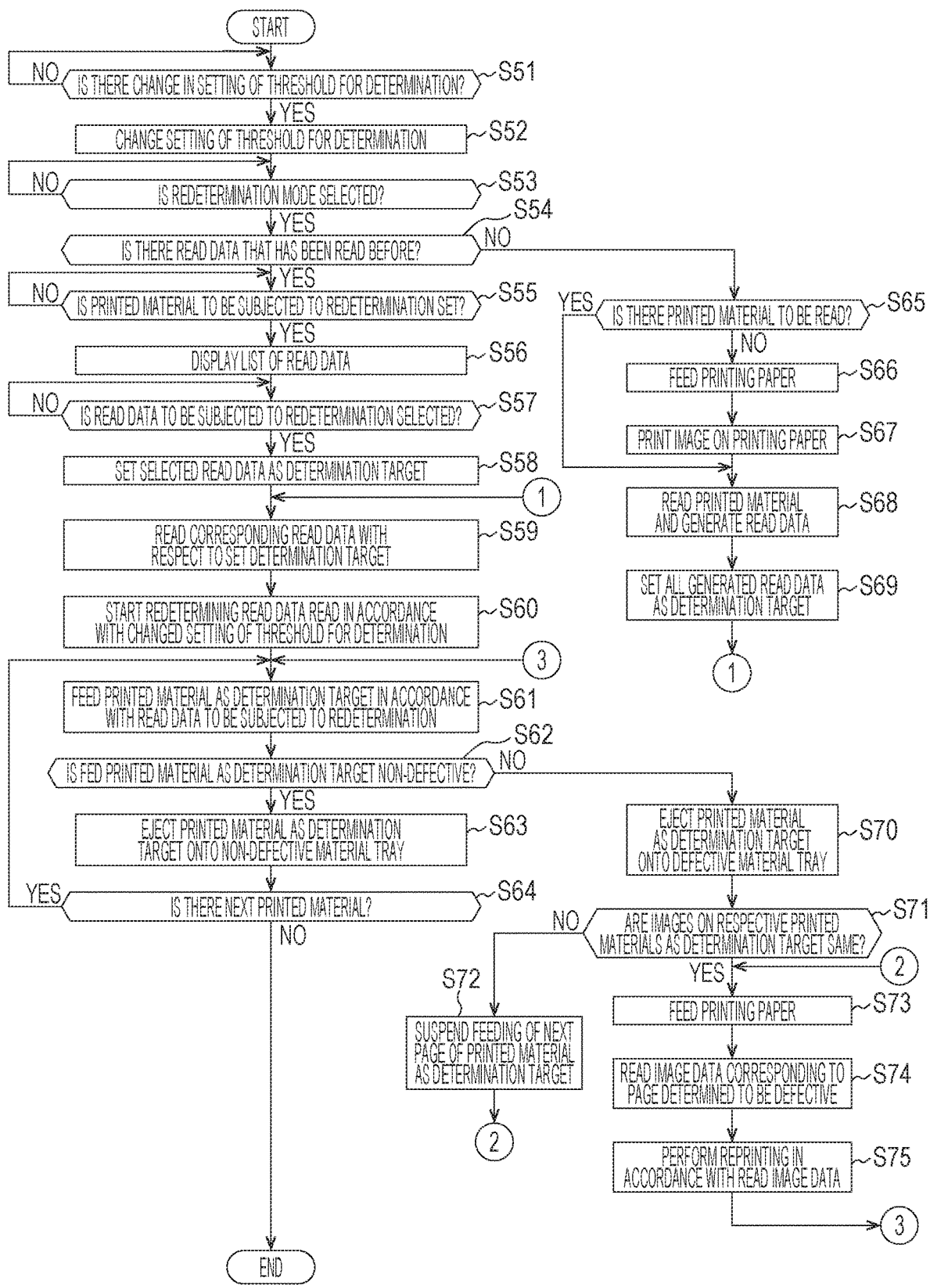
FIG. 3 is a flowchart for explaining an example of control according to a second embodiment of the present disclosure.

In a second embodiment, the structure and the functions of an image forming apparatus 1 are the same as those of the first embodiment, and therefore, explanation of them is not repeated herein. In the second embodiment, a process to be performed in a case where the same image is printed on each printed material is described. FIG. 3 is a flowchart for explaining an example of control according to the second embodiment of the present disclosure. The processing in steps S51 through S70, step S74 and step S75 in FIG. 3 are the same as the processing in steps S11 through S30, step S33, and step S34 in FIG. 1, and therefore, explanation of them is not made herein. In step S71, the controller 101 determines whether the images on the respective printed materials as the determination target are the same. If determining that the images on the respective printed materials as the determination target are the same (step S71: Y), the controller 101 moves on to the processing in step S73, and performs control to feed printing paper in step S73. If determining that the images on the respective printed materials as the determination target are not the same (step S71: N), the controller 101 moves on to the processing in step S72. In step S72, the controller 101 suspends the feeding of the next printed material as the determination target, and moves on to the processing in step S73.

According to the above description, if the images on the respective printed materials are the same, the same image is printed on all the pages. Accordingly, there is no need to perform replacement on a page-by-page basis, as long as there are the same number of printed paper sheets. Therefore, in the second embodiment, in a case where the images on the respective printed materials are not the same, the controller 101 causes the image forming part 23 to form an image on printing paper while the feeding of the next printed material is suspended. Accordingly, the overall processing time can be shortened by the amount equivalent to the suspending operation, and thus, productivity can be further increased.

Although the image forming apparatuses 1 according to the present disclosure have been described on the basis of the first and second embodiments, the present disclosure is not limited to these embodiments, and modifications may be made to them without departing from the scope of the present disclosure.

For example, in the examples described in the embodiments, the threshold determination is set via the operation unit 62. However, the present disclosure is not limited to those particular examples. For example, the threshold for determination may be transmitted from outside, and be set in the image forming apparatus 1. Further, in the examples described above, the setting unit 6 includes the display unit 61 and the operation unit 62. However, the present disclosure is not limited to that particular configuration. For example, the display unit 61 and the operation unit 62 may be integrally formed, as in a liquid crystal touch panel display.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a printer that forms an image on printing paper;
   an image reader that reads a printed material including the image formed on printing paper by the printer; and
   a hardware processor that determines whether the printed material including the image formed on printing paper by the printer is non-defective in accordance with a threshold for determination and read data, the threshold for determination specifying an error margin in a printed state of the printed material including the image formed on printing paper by the printer, and the read data corresponding to the printed material read by the image reader,
   wherein the hardware processor performs control to (i) update the threshold for determination, (ii) determine whether a redetermination mode, in which the hardware processor determines whether the printed material is non-defective in accordance with the updated threshold for determination, is set, and (iii) when it is determined that the redetermination mode is set, reprint a page on which the printed material including the image formed on printing paper by the printer is determined to be defective, and replace the page.

2. The image forming apparatus according to claim 1, wherein, when there is read data corresponding to the printed material when the threshold for determination is updated and it is determined that the redetermination mode is set, the hardware processor determines whether the printed material is non-defective in accordance with the updated threshold for determination and the read data corresponding to the printed material.

3. The image forming apparatus according to claim 1, wherein, when there is no read data corresponding to the printed material when the threshold for determination is updated and it is determined that the redetermination mode is set, the hardware processor causes the printer to form an image on the printing paper.

4. The image forming apparatus according to claim 1, further comprising:
   an ejector that ejects the printed material,
   wherein the ejector includes:
      a first tray; and
      a second tray disposed at a different position from the first tray, and
   wherein the hardware processor performs control to eject a printed material determined to be non-defective onto one of the first tray and the second tray, and to eject a printed material determined to be defective onto the other one of the first tray and the second tray.

5. The image forming apparatus according to claim 1, further comprising a detour path that allows the printed material to make a detour to avoid the printer.

6. The image forming apparatus according to claim 1, wherein, when a printed material determined to be defective is replaced with a non-defective printed material, the hardware processor causes the printer to form an image on the printing paper while suspending feeding of the next printed material.

7. The image forming apparatus according to claim 1, wherein, when images on respective printed materials are identical, the hardware processor causes the printer to form an image on the printing paper without suspending feeding of the next printed material.

8. The image forming apparatus according to claim 1, wherein the error margin is a margin of error with respect to one of a smudge size and a density.

9. The image forming apparatus according to claim 1, wherein the hardware processor further performs control to display, on a display, a list of a plurality of pieces of read data respectively corresponding to printed materials read by the image reader, and to select, in accordance with an operation by a user, one of the pieces of read data as the read data used to determine whether the printed material is non-defective.

* * * * *